US005949667A

United States Patent [19]
Libert

[11] Patent Number: 5,949,667
[45] Date of Patent: Sep. 7, 1999

[54] SUPPLY DEVICE WITH CONVERTERS CONNECTED IN REDUNDANT MODE

[75] Inventor: Louis Libert, Nozay, France

[73] Assignee: Lucent Technologies Inc., Murray Hill, N.J.

[21] Appl. No.: 09/083,167

[22] Filed: May 22, 1998

[30] Foreign Application Priority Data

May 23, 1997 [FR] France .................................. 97 06559

[51] Int. Cl.$^{6}$ ........................................ H02M 7/00

[52] U.S. Cl. ................................ 363/65; 363/56; 323/272

[58] Field of Search ................................. 363/65, 56, 71, 363/97; 323/269, 272, 270; 307/45, 38, 66, 82, 18, 19

[56] References Cited

U.S. PATENT DOCUMENTS 5,122,726 6/1992 Elliott et al. ........................... 323/272

*Primary Examiner*—Peter S. Wong
*Assistant Examiner*—Rajnikant B. Patel

[57] ABSTRACT

The present invention relates to a supply device comprising at least two energy converters (10, 20), a common output (4) and a local output (2, 3) per converter. The converters are connected in redundant mode so as to deliver a DC supply voltage (V0) on the common output, their coupling being effected by means of blocking diodes (13, 23) from whose cathode the DC supply voltage (V0) stems. Each converter includes a loop for slaving the voltage on the common output and an independent local slaving loop for delivering a sufficient voltage on the corresponding local output (17, 27) irrespective of the state of the blocking diode (13, 23) of this converter.

6 Claims, 3 Drawing Sheets

V1
V0
PWM
Vref
17
14
10
61
62
63
64
60
13
70
71
72
73
74
75
76
15
15a
15b
15c
15d
15e
15f
15g
38
12
11
+
-

TO MODULE 30
TO MODULE 40
TO MODULE 50
V1
V0
V2
PWM
Vref

SUPPLY DEVICE WITH CONVERTERS CONNECTED IN REDUNDANT MODE

FIELD OF THE INVENTION

The present invention relates to a supply device comprising at least two energy converters, a common output and a local output per converter, the converters being connected in redundant mode so as to deliver a DC supply voltage on the common output, their coupling being effected by means of blocking diodes from whose cathode the DC supply voltage stems, each converter comprising a loop for slaving the voltage on the common output and each converter also being designed to deliver a DC supply voltage on its local output.

BACKGROUND OF THE INVENTION

Featuring among the essential qualities which may be expected of transmission equipment are of course its resistance to various disturbances and its capacity to transmit data error-free which are of major importance, and also its behaviour in the event of a breakdown.

It is customary to double up all or part of the equipment in order to minimize interruptions to service. In particular, it is conventional to cater for a failure of a supply source by using a second identical supply source connected in redundant mode with the first, that is to say connected in parallel with respect to the load which is connected to the output of the two sources. In practice, electrical energy converters are generally used as supply sources.

FIG.1 represents the structure of an item of conventional transmission equipment, which item comprises two energy converters 10 and 20 intended to supply three modules 30, 40 and 50 of the equipment. The two converters constitute the supply device of the equipment. The modules 30 and 50 are supplied by the converters 10 and 20 respectively while the module 40 is supplied by both converters at once. The converter 10 (respectively 20) is supplied between a positive-voltage terminal 11 and a negative-voltage terminal 12 (21 and 22 respectively). The converters are connected in parallel with the module 40, their coupling being effected through blocking diodes 13 (23) from whose cathode a DC supply voltage V0 stems. For this purpose, each converter comprises a common output terminal 14 (24) linked to the input of the module 40 and on which it delivers the supply voltage V0. Furthermore, each converter comprises a voltage regulator 15 (25) for example of the pulse width modulation (PWM) type. A slaving loop 16 (26) maintains the voltage on the common output 14 (24) at the value V0. Each converter also comprises a local output terminal 17 (27) for providing a DC supply voltage V1 (V2) to the module 30 (50) which is not backed-up. In the example of FIG. 1, a voltage V1 or V2 equal to V0 is sought. Accordingly, each converter comprises a diode 18 (28) connected between the output of the regulator and the local output terminal in order to restore on the latter the same voltage as on the common output.

Such a structure, although commonly used, nevertheless poses some problems. Thus, the two converters supply the module 40 simultaneously with a DC voltage V0 which is kept constant by the two slaving loops. The two slaving loops having a node in common, they therefore influence one another and may bring about a misbalance of operation between the two converters. Thus, if for example the converter 10 delivers a rising voltage V0, the converter 20 will detect this rise in the voltage V0 and the slaving loop 26 will react so as to lower the output voltage of the regulator 25. At some stage the blocking diode 23 turns off and, the slaving loop 26 being unable to operate, the output of the regulator falls to zero. If the converter 10 then suffers a failure, the converter 20 will start operating normally again, however there will be a transient period during which the module 40 will not be supplied. This period corresponding to an interruption of service of the equipment is not acceptable. Another drawback is that, in the above configuration, the converter 20 is not able to provide the voltage V2 expected on the local output 27 when its slaving loop cannot operate. Finally, such an arrangement ignores the fact that the voltage drop in the diodes of the device varies greatly according to temperature and may therefore introduce disparities between the voltages V0, V1 and V2 which are assumed to be equal in the example of FIG. 1.

To remedy these drawbacks, various solutions have been described in the state of the art. A known converter is described in FIG. 2. It differs from the converter 10 of FIG. 1 through its mechanism 16 for slaving the voltage of the common output. The slaving mechanism described in this document takes account of the state (off or on) of the blocking diode in order to control the regulator. To this end, the slaving mechanism 16 taps the voltage either side of the blocking diode 13 by means of two resistor bridges 31, 32 and 33, 34. The midpoint 35 of the resistor bridge 31, 32 is linked to the midpoint 36 of the resistor bridge 33, 34 via a diode 37. The cathode of this diode is connected to the node 35 while the anode is connected to the node 36. The node 36 is moreover connected to the inverting input of an operational amplifier 38 which additionally receives a reference voltage Vref on its non-inverting input. Finally, the output of the amplifier 38 is linked to a control input of the regulator 15.

This converter operates as follows: as long as the blocking diode 13 is on, a fraction of the common supply voltage V0 is compared with the reference voltage Vref in order to control the regulator 15. During this phase, the diode 37 is off. On the other hand, as soon as the blocking diode 13 switches off, the diode 37 comes on and the voltage on the node 36 will fall owing to the parallel mounting of the resistors 32 and 34. The operational amplifier 38 therefore receives a falling voltage on its inverting input and its output will therefore act on the regulator in such a way that it increases its output voltage and thus switches the blocking diode 13 back on.

Such a converter only partially solves the problems mentioned earlier. Thus, the voltage V1 or V2, delivered on the local output of the converter 10 or 20, of smaller rating is not sufficient when the latter's blocking diode is off or at its turn-off limit. Thus, if the blocking diode switches off, it is because the regulator is not delivering enough to yield the voltage V0 on its common output. Also, since the diodes 13 (23) and 18 (28) are identical, the converter is then unable to deliver enough voltage V1 or V2 on its local output. Moreover this converter does not solve the problem of the spread in the values of the voltage drop in the diodes as a function of temperature.

SUMMARY OF THE INVENTION

An objective of the invention is to overcome some or all of the above-mentioned drawbacks.

This objective is achieved in the invention by dispensing with the diode present on the local output of the converter and replacing it with a local voltage adjuster (V1 or V2) which are independent of the other parts of the converter.

The invention includes a supply device comprising at least two energy converters, a common output and a local output per converter, the converters being connected in redundant mode so as to deliver a DC supply voltage on the common output, their coupling being effected by means of blocking diodes from whose cathode the DC supply voltage stems, each converter comprising a loop for slaving the voltage on the common output and each converter also being designed to deliver a DC supply voltage on its local output, characterized in that the voltage on each local output is slaved and in that this slaving is independent of the slaving of the voltage on the common output.

Preferably, an MOS type transistor is connected to each of the local outputs in order to slave the voltage on each of them and this transistor is controlled by a local slaving loop.

With this structure, the drain-source voltage Vds of the MOS type transistor is controlled indirectly by the local slaving loop so as to deliver a sufficient voltage on the local output. Thus, when the blocking diode is off or at the turn-off limit, the voltage Vds is almost zero. Conversely, with the converter imposing the voltage V0 on the common output, the voltage Vds of the MOS type transistor will be almost equal to the threshold voltage of the blocking diode so as to impose a voltage almost equal to the voltage V0 on the local output.

This independent adjustment of the local voltage also makes it possible to deliver, if so desired, a voltage V1 or V2 slightly greater than V0. This may be of particular benefit in compensating for losses in the cables linking the supply device to the modules 30 or 50 of the equipment.

According to a particular embodiment of the invention, the local slaving loop consists, for each converter, of a control block which receives, on its input, a fraction of the voltage on the corresponding local output, which voltage fraction is produced by a first resistor bridge, and delivers a control voltage on the control gate of the MOS type transistor.

To prevent any overheating of the MOS type transistor in the event of a short-circuit on the local output, the MOS type transistor is furnished with a protection diode connected between its drain and its source. In practice, this protection diode is a parasitic diode of the MOS type transistor.

Furthermore, according to the invention, the loop for slaving the voltage on the common output of each converter includes:

- an operational amplifier which receives, on its non-inverting input, a reference voltage and, on its inverting input, an intermediate voltage corresponding to a fraction of the voltage on the common output, which voltage fraction is imposed by a second resistor bridge, and which delivers a slaving voltage to the corresponding converter, and
- means for detecting the turning off of the corresponding blocking diode which are able to lower the intermediate voltage when it is off.

According to a preferred embodiment of the invention, the detection means consist, for each converter, of a diode whose anode is connected to the anode of the corresponding blocking diode and whose cathode is connected to earth via a first resistor, the cathode of the said diode being additionally connected to the gate of a P type bipolar transistor, which transistor has its drain linked to earth via a second resistor, its source linked to a node of the second resistor bridge and the role of which is to lower the value of the intermediate voltage when it is on.

BRIEF DESCRIPTION OF THE DRAWINGS

Other characteristics and advantages of the invention will emerge from reading the detailed description which follows and which is given with reference to the appended drawings in which.

DETAILED DESCRIPTION

Figure 1:
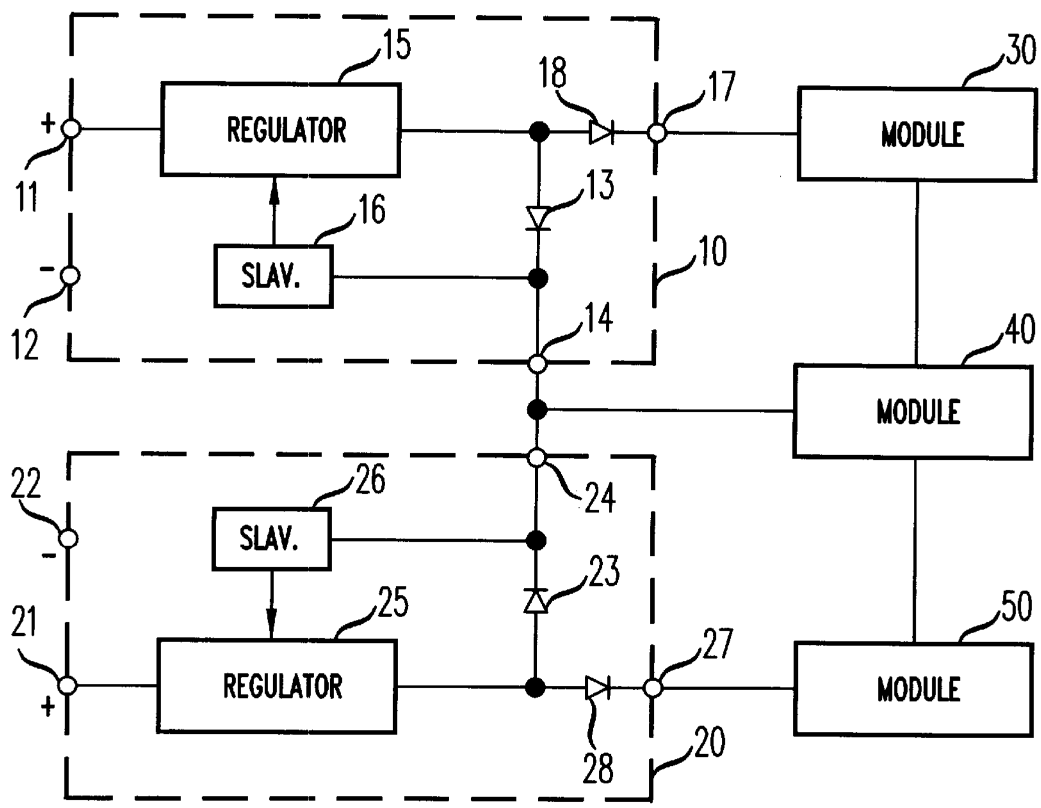
FIG. 1, already described, is the overall diagram of a supply device designed to supply the various modules of an item of equipment.
Figure 2:
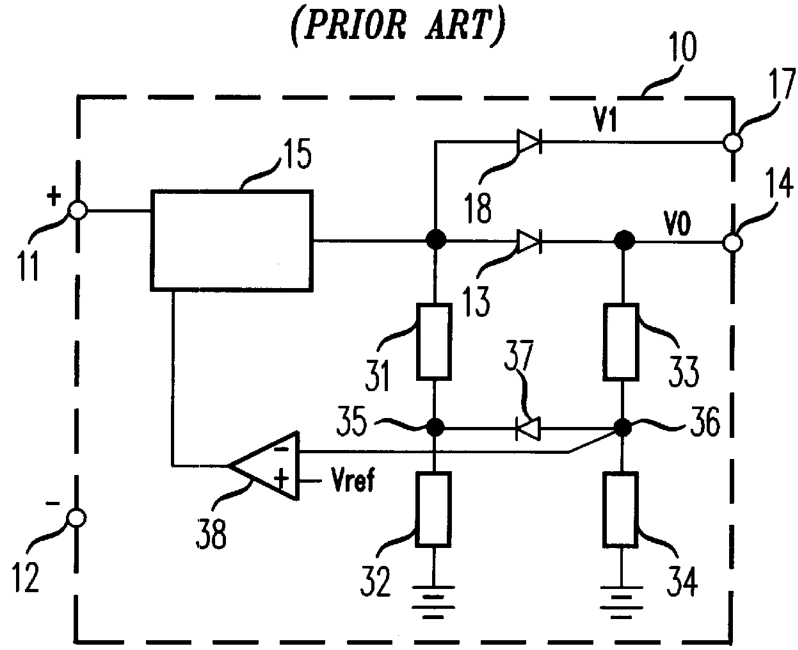
FIG. 2, already described, is the basic diagram of a known converter.
Figure 3:
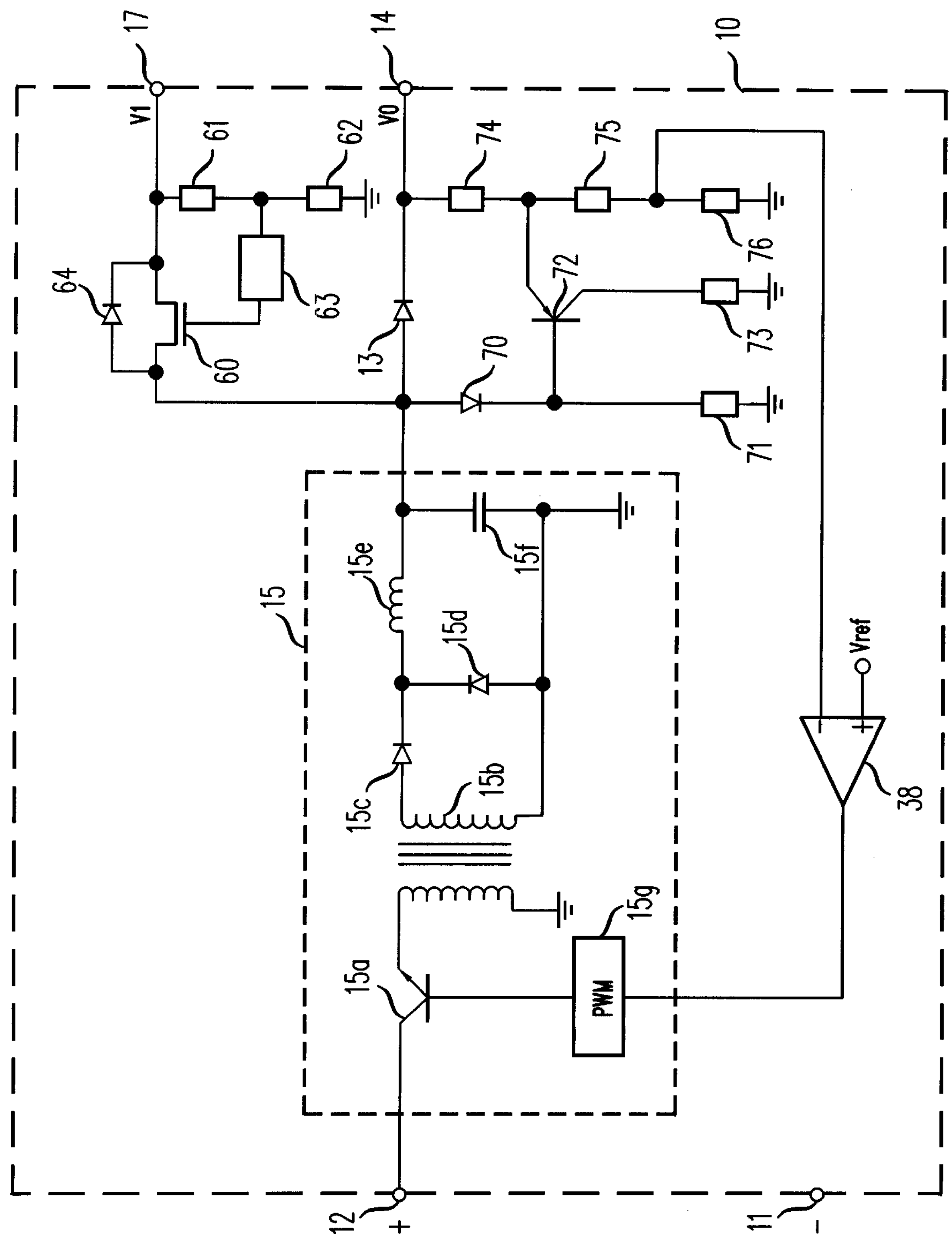
FIG. 3 is the detailed diagram of a converter according to the invention.

The converter of FIG. 3 re-uses the main elements of the converter 10, especially the regulator 15, the blocking diode 13, the supply terminals 11 and 12 and the output terminals 14 and 17. A detailed diagram of the regulator 15 is described in this figure. This regulator comprises a switching transistor 15*a* which is connected to one terminal of the primary winding of a decoupling transformer 15*b*, the other terminal of the primary winding being connected to earth. The secondary winding of the transformer 15*b* is connected, on one side, to earth and, on the other side, to the anode of a rectifying diode 15*c*. The cathode of this diode is moreover connected, on the one hand, to the cathode of a protection diode 15*d* and, on the other hand, to a first terminal of a filtering coil 15*e*. The second terminal of the filtering coil 15*e* is connected to earth via a filtering capacitor 15*f*. Similarly, the anode of the protection diode 15*d* is linked to earth. The output of the regulator 15 is connected to the second terminal of the filtering coil 15*e*. The anode of the blocking diode 13 is connected to this output and its cathode is linked to the common output terminal 14.

The local output 17 of the converter is linked to the output of the regulator 15 via an MOS type transistor 60. The voltage V1 on the local output 17 is slaved by a local slaving loop consisting of a resistor bridge 61, 62 and a control block 63. This control block receives, on its input, a fraction of the voltage on the local output 17 and outputs a control voltage which is applied to the gate of the transistor 60. Thus, when the voltage V1 falls, the block 63 delivers a higher control voltage so as to lower the drain-source voltage Vds of the transistor 60. In practice, this control block compares the voltage of the midpoint of the resistor bridge 61, 62 with a set-point voltage and delivers a voltage which depends on the result of this comparison. Since this local slaving loop has its own set-point voltage, the adjusting of the voltage V1 is therefore independent of that of the voltage V0. The voltage V1 may thus be adjusted to a value whereby it is possible to compensate for the losses in the cables linking the converter to the module 30.

Preferably, the transistor 60 is furnished with a protection diode 64, which is in fact a parasitic diode of the transistor, in order to prevent the overheating and destruction of the transistor in the event of a short-circuit on the local output. This diode does not solve the short-circuit problem, it merely transfers the deficiency upstream of the transistor, but it is intended only to protect the transistor 60.

To prevent a converter from going out of service when the other converter of the device imposes the voltage V0 on the common output, a loop is therefore provided for slaving the voltage on the common output with the voltage tapped on either side of the blocking diode 13. Thus, the anode of the blocking diode 13 is linked to the anode of a diode 70 whose cathode is connected to earth via a resistor 71. The cathode of the diode 70 is moreover connected to the base of a PNP type bipolar transistor 72. In practice, the diode 70 is made from a bipolar transistor identical to the transistor 72 whose collector and base have been linked together. These two elements, the diode 70 and the transistor 72, consequently have the same threshold voltage. The collector of the transistor 72 is linked to earth via a resistor 73 and its emitter is connected to an intermediate node of a resistor bridge consisting of three resistors 74, 75, 76 mounted in series between the common output 14 and earth. The emitter of transistor 72 is more particularly linked to the midpoint of the resistors 74 and 75. The value of the resistor 74 is a few ohms. The direction of the diodes of the arrangement and the polarity of the bipolar transistor 72 (PNP type transistor) means that, in the example, the voltage V0 is positive. In the case of a negative voltage, the direction of the diodes is reversed and the bipolar transistor is of the NPN type.

Moreover, the midpoint of the resistors 75 and 76 is connected to the inverting input of the operational amplifier 38 which additionally receives the reference voltage Vref on its non-inverting input. Finally, the output of the amplifier 28 is connected to a pulse width modulator 15*g* which controls the switching transistor 15*a*.

During nominal operation, the blocking diode 13 is on and the anode voltage of the blocking diode 13 is greater than the voltage V0. The transistor 72 is therefore off and a fraction of the voltage V0 is compared with the reference voltage Vref. The regulator reacts on the basis of the result of this comparison.

If, with the voltage V0 rising, the anode voltage of the blocking diode 13 drops below the voltage V0, the diode 13 switches off. The diode 70 and the transistor 72 having the same threshold voltage, this transistor imposes a voltage of less than the voltage V0 on the midpoint between the resistors 74 and 75. Since the resistor 74 has a very low value, the voltage at this point was equal to V0 during nominal operation. This lowering of the voltage at this point will also lower the voltage applied to the inverting input of the operational amplifier 38. In response to this fall in the voltage at the midpoint between the resistance 74 and 75, the regulator increases the voltage on its output so as to switch the blocking diode 13 back on. Through this device, a drop in the voltage V0 is therefore simulated in order to switch the blocking diode back on.

Figure 4:
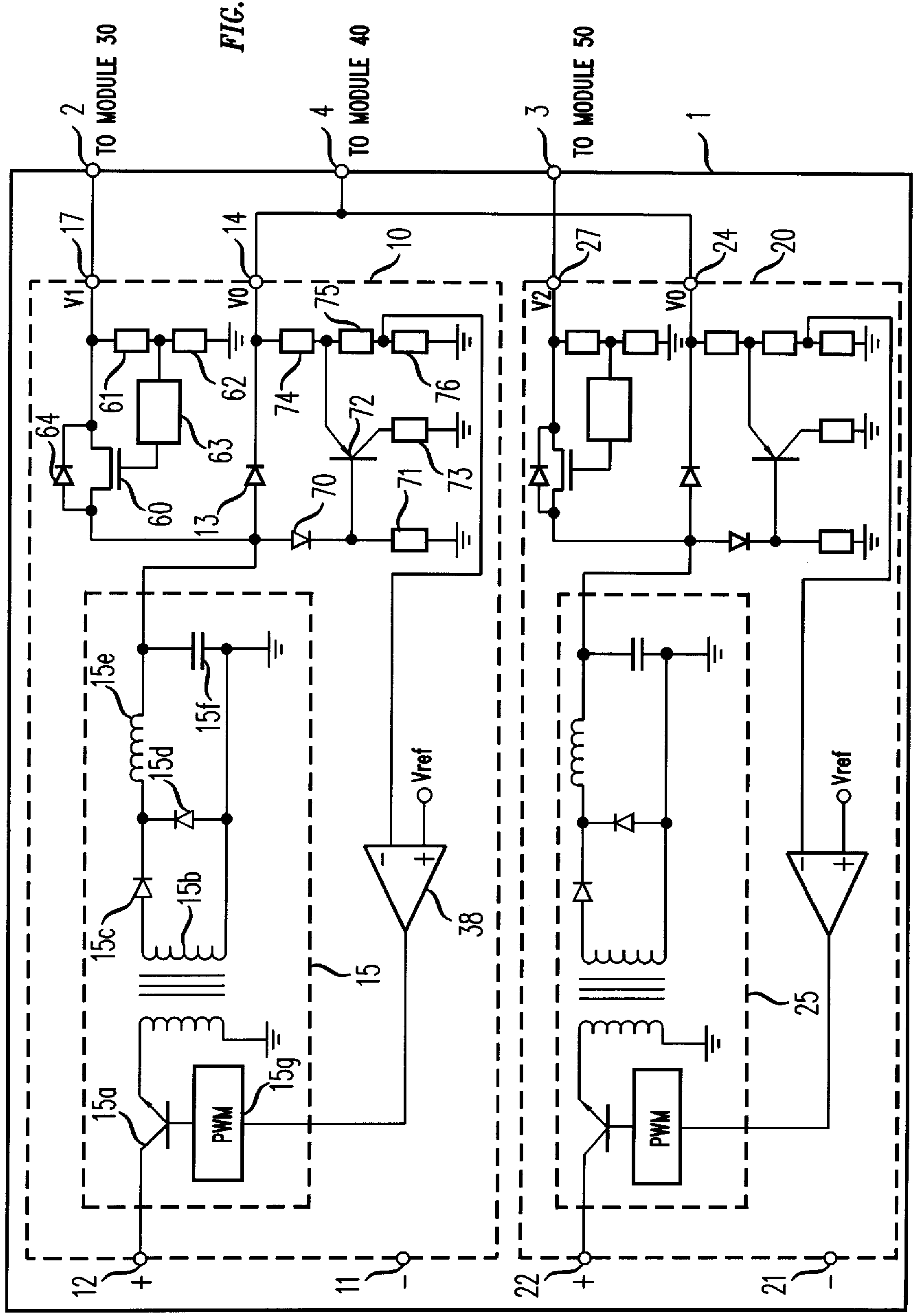
FIG. 4 is the detailed diagram of a supply device according to the invention.

FIG. 4 represents a complete diagram of the supply device according to the invention. It comprises two converters such as represented in FIG. 3. The supply device is labelled 1. It comprises two local outputs 2 and 3 respectively corresponding to the local output 17 of the converter 10 and to the local output 27 of the first converter 20 as well as a common output 4 corresponding to the common outputs 14 and 24 of the converters 10 and 20. Otherwise, the diagram of the converters is identical to that depicted in FIG. 3.

What is claimed is:

1. Supply device comprising at least two energy converters, a common output and a local output per converter, the converters being connected in redundant mode so as to deliver a DC supply voltage (V0) on the common output, their coupling being effected using blocking diodes from whose cathode the DC supply voltage (V0) stems, each converter comprising a loop for slaving the voltage on the common output and each converter also being designed to deliver a local DC supply voltage (V1, V2) on its local output, each converter further comprising a local slaving loop for adjusting the voltage on its respective local output.

2. Supply device according to claim 1, wherein the loop for slaving the voltage on the common output of each converter includes:

an operational amplifier which receives, on its non-inverting input, a reference voltage (Vref) and, on its inverting input, an intermediate voltage corresponding to a fraction of the voltage on the common output, which voltage fraction is imposed by a second resistor bridge, and which delivers a slaving voltage to the corresponding converter, and a detector that turns off the corresponding blocking diode which are able to lower the intermediate voltage when it is off.

3. Supply device according to claim 2, wherein the detector includes: for each converter, a diode whose anode is connected to the anode of the corresponding blocking diode and whose cathode is connected to earth via a first resistor, the cathode of the said diode being additionally connected to the base of a PNP type bipolar transistor, which transistor has its collector linked to earth via a second resistor, its emitter linked to a node of the second resistor bridge and the role of which is to lower the value of the intermediate voltage when it is on.

4. Supply device comprising:

at least two energy converters, a common output and a local output per converter, the converters being connected in redundant mode so as to deliver a DC supply voltage on the common output, their coupling being effected using blocking diodes from whose cathode the DC supply voltage (V0) stems, each converter having a loop for slaving the voltage on the common output and each converter also being designed to deliver a local DC supply voltage (V1, V2) on its local output each converter further having a local slaving loop for adjusting the voltage on its respective local output wherein in order to slave the voltage on each of the local outputs, an MOS type transistor is connected to each of them, the transistor being controlled by the local slaving loop.

5. Supply device according to claim 4, wherein the local slaving loop consists, for each converter, of a control block which receives, on its input, a fraction of the voltage on the corresponding local output (V1, V2), which voltage fraction is produced by a first resistor bridge, and delivers a control voltage on the control gate of the MOS type transistor.

6. Supply device according to claim 5, wherein the MOS type transistor is furnished with a protection diode connected between its drain and its source.

* * * * *